United States Patent
Tamaki et al.

(10) Patent No.: US 9,570,838 B2
(45) Date of Patent: Feb. 14, 2017

(54) STRUCTURE OF HIGHLY WATERPROOF CONNECTOR FOR EASY CONDUCTION BETWEEN GROUND PIN AND BODY

(71) Applicant: FANUC Corporation, Yamanashi (JP)

(72) Inventors: Takeshi Tamaki, Yamanashi (JP); Kouji Kobayashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 68 days.

(21) Appl. No.: 14/151,603

(22) Filed: Jan. 9, 2014

(65) Prior Publication Data

US 2014/0199870 A1    Jul. 17, 2014

(30) Foreign Application Priority Data

Jan. 11, 2013   (JP) .................................. 2013-003599

(51) Int. Cl.
| | | |
|---|---|---|
| *H01R 13/52* | (2006.01) | |
| *H01R 13/6596* | (2011.01) | |
| *H01R 13/658* | (2011.01) | |
| *H02K 5/22* | (2006.01) | |

(52) U.S. Cl.
CPC ...... *H01R 13/5202* (2013.01); *H01R 13/6596* (2013.01); *H01R 13/65802* (2013.01); *H02K 5/225* (2013.01); *H02K 11/40* (2016.01)

(58) Field of Classification Search
CPC ..................... H01R 13/5202; H01R 13/65802; H01R 13/6596; H02K 11/40; H02K 5/08
USPC ............... 439/95, 96, 607.28, 101, 108, 109
See application file for complete search history.

(56) References Cited

U.S. PATENT DOCUMENTS

| | | | | |
|---|---|---|---|---|
| 4,732,568 A | * | 3/1988 | Hall ............................... | 439/676 |
| 4,738,628 A | * | 4/1988 | Rees ............................... | 439/95 |
| 5,240,424 A | * | 8/1993 | Honma et al. .................. | 439/95 |
| 5,573,411 A | | 11/1996 | Bartosz et al. | |
| 5,971,811 A | | 10/1999 | Mori et al. | |
| 6,254,403 B1 | * | 7/2001 | Bernardini ..................... | 439/95 |
| 7,537,466 B2 | * | 5/2009 | Bartholoma et al. ........... | 439/95 |
| 2004/0266230 A1 | | 12/2004 | Chiran et al. | |
| 2010/0046189 A1 | | 2/2010 | Hasegawa et al. | |
| 2014/0199870 A1 | | 7/2014 | Tamaki et al. | |

FOREIGN PATENT DOCUMENTS

| | | |
|---|---|---|
| CN | 203883221 U | 10/2014 |
| DE | 3912189 C2 | 5/1992 |
| DE | 4419023 A1 | 12/1995 |
| DE | 19822015 A1 | 11/1998 |

(Continued)

OTHER PUBLICATIONS

Office Action mailed May 27, 2014, corresponds to Japanese patent application No. 2013-003599.

(Continued)

*Primary Examiner* — Felix O Figueroa
(74) *Attorney, Agent, or Firm* — Hauptman Ham, LLP (57) ABSTRACT

A connector for power or braking attached to an electric motor is based on resin molding around a ground pin and a power supply pin. In this connector, an electrical junction between the ground pin and the body of the electric motor or of a brake is disposed in a predetermined position on the inner peripheral side of a sealing portion which seals the interior of the brake or electric motor body from the air.

1 Claim, 10 Drawing Sheets (56) References Cited

FOREIGN PATENT DOCUMENTS

| | | |
|---|---|---|
| DE | 112008000565 T5 | 1/2010 |
| EP | 1429427 A1 | 6/2004 |
| GB | 2413714 B | 8/2006 |
| JP | 62129878 U | 8/1987 |
| JP | 11-289702 A | 10/1999 |
| JP | 2001-313124 A | 11/2001 |
| JP | 200225645 A | 1/2002 |
| JP | 2004-319277 A | 11/2004 |
| JP | 2008-41600 A | 2/2008 |
| JP | 201248942 A | 3/2012 |

OTHER PUBLICATIONS

Decision to Grant a Patent mailed Nov. 4, 2014, corresponding to Japanese patent application No. 2013-003599.
Office Action dated Jul. 1, 2015, corresponding to German patent application No. 102014100142.7.

\* cited by examiner

FIG.11
Prior Art

# STRUCTURE OF HIGHLY WATERPROOF CONNECTOR FOR EASY CONDUCTION BETWEEN GROUND PIN AND BODY

RELATED APPLICATIONS

The present application claims priority to Japanese Application Number 2013-003599, filed Jan. 11, 2013, the disclosure of which is hereby incorporated by reference herein in its entirety.

BACKGROUND OF THE INVENTION

Field of the Invention

The present invention relates to a structure of a connector, and more particularly, to a structure of a connector used to connect a ground pin to an electric motor or brake.

Description of the Related Art

A connector connected to an electric motor or brake is provided with a ground wire, which is electrically connected to the body of the motor or brake to prevent a shock hazard in case of electrical leakage. A conventional connector based on resin molding around pins is made conductive to the brake or motor body by a fixture through a wire or the like extending from a ground pin.

Figure 7:
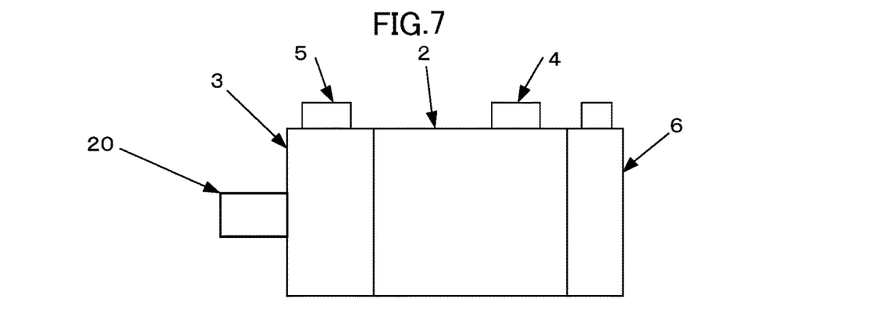
FIG. 7 is a view illustrating an electric motor with a brake.

FIG. 7 is a view illustrating an electric motor with a brake. The motor comprises the brake and a rotation detector. As shown in FIG. 7, a power connector 4 is attached to a body 2 of the motor, and a brake connector 5 is attached to a body 3 of the brake. Reference numeral 6 denotes the body of the detector.

Figure 8:
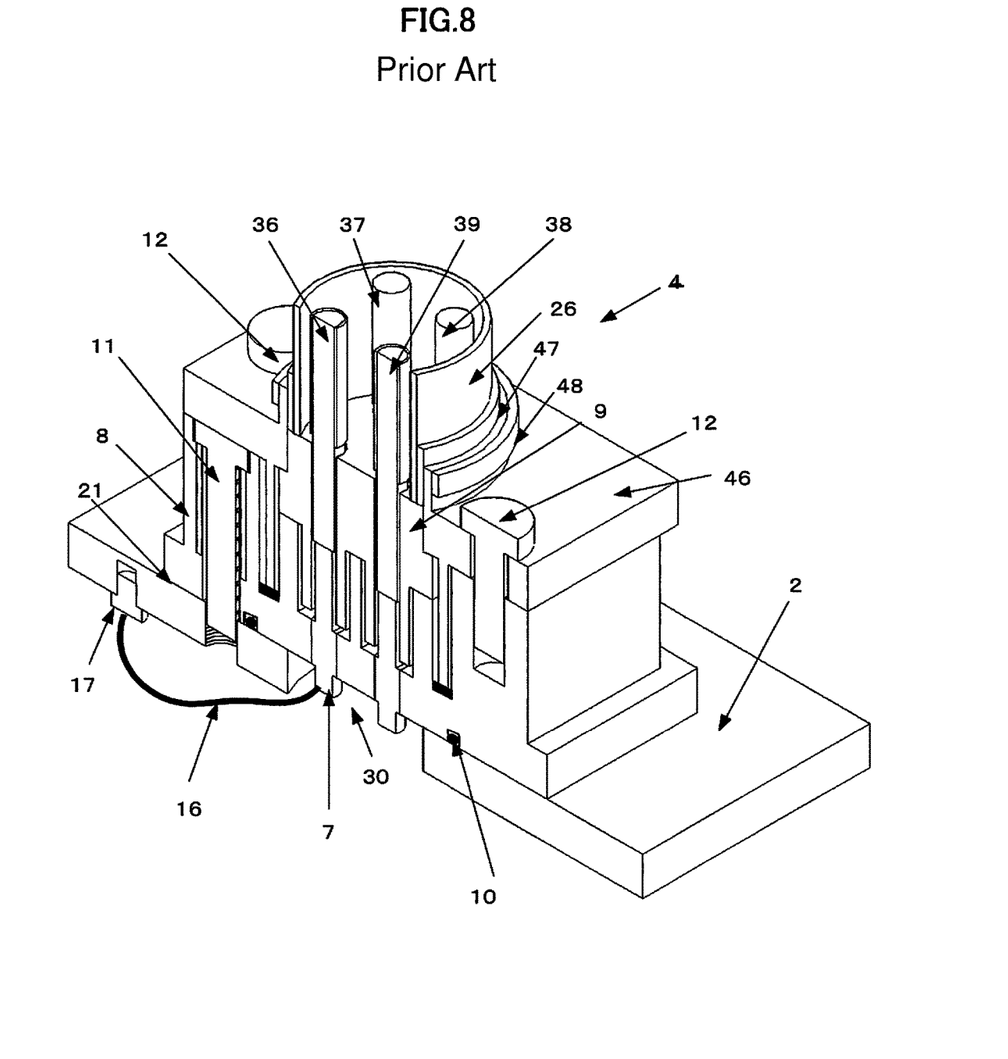
FIG. 8 is a perspective view illustrating a prior art technique in which a ground pin and the body of an electric motor are made conductive to each other by a wire.
Figure 9:
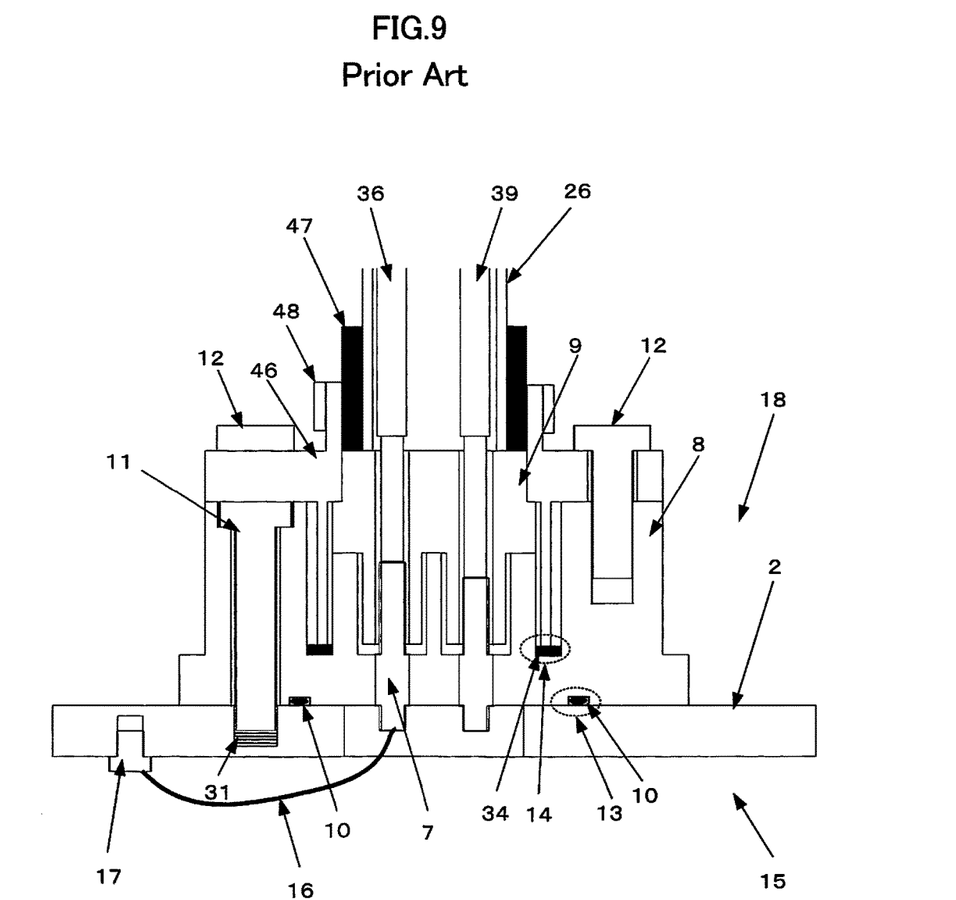
FIG. 9 is a front sectional view corresponding to FIG. 8.

FIGS. 8 and 9 are views illustrating a prior art technique in which a ground pin and a motor body are made conductive to each other by a wire. As shown in FIGS. 8 and 9, the power connector 4 is attached to the motor body 2. An end portion of a ground pin 7 of the power connector 4 on the side of the motor body 2 and a fixture 17 secured to the motor body 2 are electrically connected to each other by a wire 16 for conduction.

In the technique illustrated in FIGS. 8 and 9, the boundary between a cable 26 and a connector cover 46 of a cable-side connector 9 is waterproofed by tightening a bushing 47 and the connector cover 46 by means of a cable clamp 48. Further, the boundary between the cable-side connector 9 and a connector (body-side connector) 8 on the side of the motor body 2 is waterproofed by tightening a gasket 34 (sealing portion 14 between the body-side and cable-side connectors) at the boundary between the connector cover 46 and the body-side connector 8 by means of cable-side connector mounting fixtures 12. Furthermore, the boundary between the body-side connector 8 and the motor body 2 is waterproofed by tightening a gasket 10, for use as a sealing portion 13 (FIG. 9) between the body-side connector 8 and the motor body 2, by means of a body-side connector mounting fixture 11.

Japanese Patent Application Laid-Open No. 11-289702 discloses an electric motor with its stator coil supplied with electric power, in which a stator core of the circuit board is connected to a ground pin of a power line connector by a bolt, annular plate, and ground wire. Further, Japanese Patent Application Laid-Open No. 2004-319277 discloses a waterproof shield structure in which a ground terminal is crimped to the end of a shield of a shield cable.

According to the prior art technique described above with reference to FIGS. 8 and 9, it is time-consuming to make the ground pin conductive to the brake or motor body. To save time, therefore, it is proposed to make this conduction by a connector mounting fixture. This technique will now be described with reference to FIGS. 10 and 11.

Figure 10:
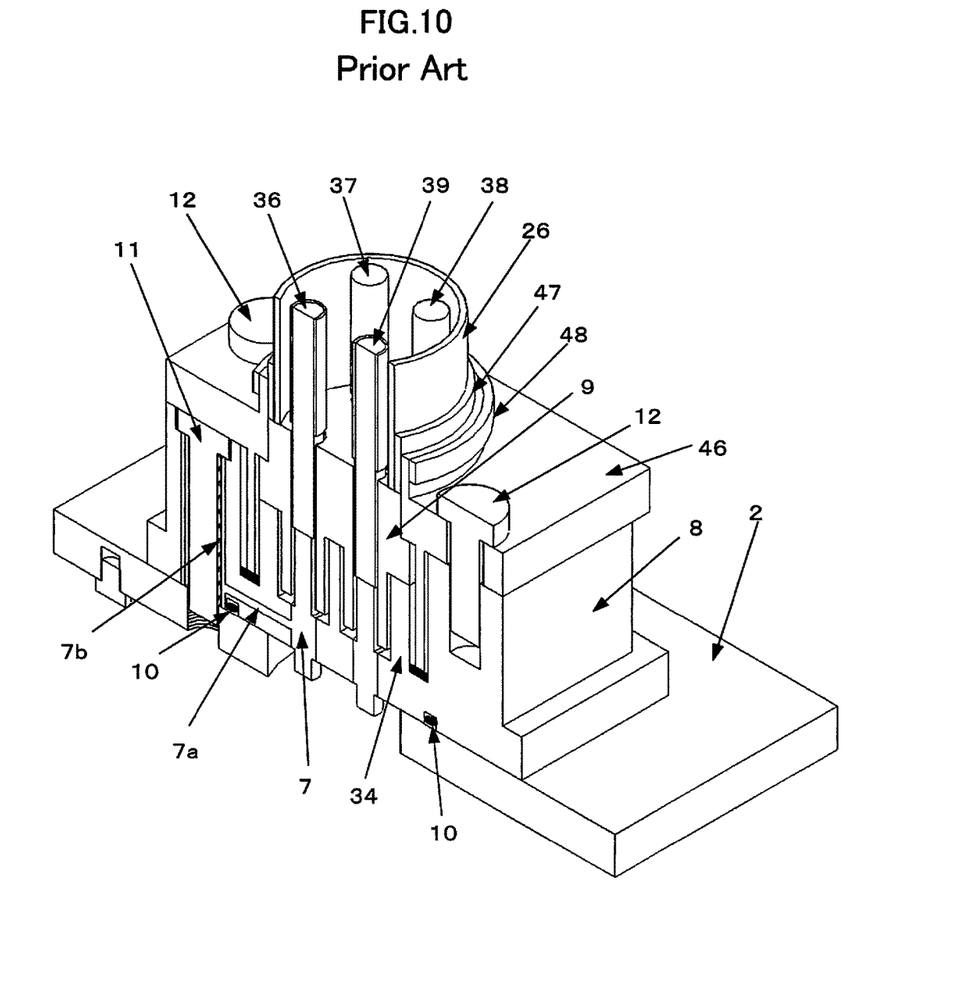
FIG. 10 is a perspective view illustrating a prior art technique in which a ground pin and the body of an electric motor are made conductive to each other by a connector mounting fixture.
Figure 11:
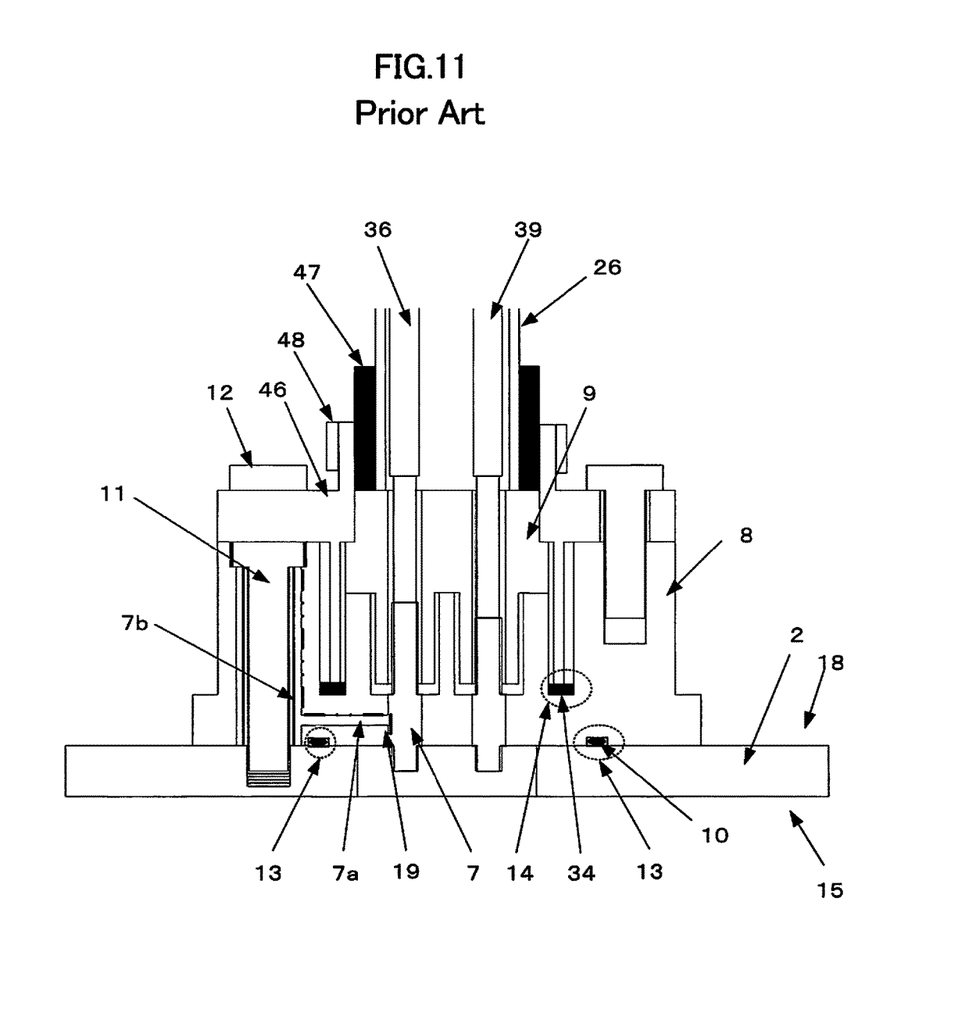
FIG. 11 is a front sectional view corresponding to FIG. 10.

FIGS. 10 and 11 are views illustrating a prior art technique in which a ground pin is made conductive to a motor body by a connector mounting fixture.

A cable-side connector 9 is secured to a body-side connector 8 by cable-side connector mounting fixtures 12. A ground pin 7 is electrically connected to a motor body 2 through a conduction portion 7b and a bridge portion 7a. The bridge portion 7a extends from a side surface of an end portion of the ground pin 7 on the side of the motor body 2 toward the conduction portion 7b. The conduction portion 7b covers the outer periphery of a body-side connector mounting fixture 11 and electrically connects it to the motor body 2.

In the technique shown in FIGS. 10 and 11, however, the ground pin 7 and the motor body 2 are made conductive to each other by the fixture (not by the wire 16 shown in FIGS. 8 and 9 or the like), so that a path is inevitably formed between a body-interior-portion side 15 and an atmosphere side 18 of the motor through the conduction portion 7b, bridge portion 7a extending to the conduction portion 7b, and ground pin 7.

SUMMARY OF THE INVENTION

Accordingly, the object of the present invention is to provide a highly waterproof connector for power or braking attached to an electric motor, based on resin molding around a plurality of pins including at least a ground pin and a power supply pin, and configured so that the ground pin can be easily made conductive to the body of the electric motor or of a brake.

A structure of a connector for power or braking according to the present invention is attached to an electric motor and is based on resin molding around at least a ground pin and a power supply pin, wherein an electrical junction between the ground pin and a body of the electric motor or a brake is disposed in a predetermined position on the inner peripheral side of a sealing portion which seals the interior of the body of the electric motor or the brake from the air.

The electrical junction may comprise a connection structure in which a convex connection structure is employed on the side of the body of the electric motor or the brake, or on the side of the connector. Further, when the convex connection structure is employed on the side of the body of the electric motor or the brake, at least two convex structures, similar to the convex connection structure and electrically connected to neither the ground pin nor the power supply pin, may be further provided on the body of the electric motor or the brake, whereas, when the convex connection structure is employed on the side of the connector, at least two convex structures, similar to the convex connection structure and electrically connected to neither the ground pin nor the power supply pin, may be further provided on the connector.

The electrical junction may comprise a spring structure.

According to the present invention, there can be provided a highly waterproof connector for power or braking attached to an electric motor, based on resin molding around a plurality of pins including at least a ground pin and a power supply pin, and configured so that the ground pin can be easily made conductive to the body of the electric motor or of a brake.

BRIEF DESCRIPTION OF THE DRAWINGS

The above and other objects and features of the present invention will be obvious from the ensuing description of embodiments with reference to the accompanying drawings, in which:

FIG. 3-A is a view illustrating a structure of a power connector attached to an electric motor according to Embodiment 2 of the invention, and FIG. 3-B is an enlarged view of area 41 of FIG. 3-A;

FIG. 4-A is a view illustrating a structure of a power connector attached to an electric motor according to Embodiment 3 of the invention, and FIG. 4-B is an enlarged view of area 41 of FIG. 4-A;

FIG. 5-A is a view illustrating a structure of a power connector attached to an electric motor according to Embodiment 4 of the invention, and FIG. 5-B is an enlarged view of area 41 of FIG. 5-A;

DETAILED DESCRIPTION OF THE PREFERRED EMBODIMENTS

As described before with reference to FIG. 7 showing the prior art technique, the power connector 4 is attached to the body 2 of the electric motor, and the brake connector 5 to the body 3 of the brake. Reference numeral 6 in FIG. 7 denotes the body of the detector. The electromagnetic brake is connected directly to the motor to stop the rotation of a power shaft 20 and maintain a stopped state. Thus, electric power is externally supplied to the brake as well as to the motor. The metallic bodies 2 and 3 of the motor and brake must be grounded to avoid danger.

The present invention is applied to electrical connection between the body of the motor and a ground pin of the power connector in the motor and electrical connection between the body of the brake and a ground pin of brake connector in the motor. Since the power and brake connectors are not particularly different in structure, however, only the electrical connection between the ground pin of the power connector and the motor body will now be described below solely.

Embodiment 1

A structure of a power connector attached to an electric motor according to Embodiment 1 of the present invention will be described with reference to FIGS. 1 and 2.

A connector (body-side connector) 8 on the side of a body 2 of a motor is secured to a connector mounting portion 21 of the body 2. The boundary between a cable 26 and a connector cover 46 of a cable-side connector 9 is waterproofed by tightening a bushing 47 and the connector cover 46 by means of a cable clamp 48. Further, the boundary between the body-side and cable-side connectors 8 and 9 is waterproofed by tightening a gasket 34 (sealing portion 14 between the connectors 8 and 9) at the boundary between the connector cover 46 and the body-side connector 8 by means of cable-side connector mounting fixtures 12. The boundary between the body-side connector 8 and the motor body 2 is waterproofed by tightening a gasket 10, which constitutes a sealing portion 13 between the body-side connector 8 and the motor body 2, by means of a body-side connector mounting fixture 11.

The connector mounting portion 21 of the motor body 2 is provided with an opening 30 through which respective one end portions (lower end portions) of a ground pin 7 and pins 27, 28 and 29 for power supply are exposed to a body-interior-portion side 15 of the motor. The power supply pins 27 to 29 are metallic pins for supplying power to the motor, while the ground pin 7 serves to ground the motor body 2. In FIGS. 1 and 2, the pins 27 and 28 are invisible behind the pins 7 and 29, respectively.

To secure the body-side connector 8 to the connector mounting portion 21 of the motor body 2, moreover, the connector mounting portion 21 is provided with an internal thread hole 31 into which an end portion (external thread structure) of the body-side connector mounting fixture 11 is driven. Since the body-side connector 8 is secured to the connector mounting portion 21 by means of at least two body-side connector mounting fixture 11, the connector mounting portion 21 is provided with two such internal thread holes 31.

The body-side connector 8 is a connector based on resin molding around the power supply pins 27 to 29 and the ground pin 7. The respective other end portions of the power supply pins 27 to 29 and the ground pin 7, that is, the end portions opposite to the one end portions exposed to the body-interior-portion side 15 of the motor through the opening 30 of the motor body 2, are exposed to the outside through a resin mold portion of the body-side connector 8.

The body-side connector 8 comprises at least two fitting portions 45 (FIG. 3), at least two internal thread holes 35, annular flat surface 32, and annular groove 33. The body-side connector mounting fixtures 11 can be fitted into the fitting portions 45, individually. The cable-side connector mounting fixtures 12 can be fitted into the internal thread holes 35, individually. The annular flat surface 32 serves to seal the junction between the body-side and cable-side connectors 8 and 9. The annular groove 33 serves to seal the junction between the body-side connector 8 and the motor body 2. As shown in FIGS. 1 to 5, the annular flat surface 32 comprises a horizontal bottom surface, which defines a groove (formed of the horizontal bottom surface and two vertical wall surfaces on the opposite sides thereof) in the body-side connector 8, and a horizontal flat surface, which defines a portion with an L-shaped cross-section (formed of a vertical wall and a horizontal flat surface) in the body-side connector 8. In FIG. 1, the L-shaped portion is invisible behind the groove.

The annular gasket 34 of heat-resistant rubber with a rectangular cross-section is mounted on the annular flat surface 32, and the annular gasket 10 of heat-resistant rubber with a circular cross-section is attached to the annular groove 33. The annular flat surface 32 and the annular groove 33 are provided on the body-side connector 8 so as to surround the ground pin 7 and the power supply pins 27 to 29 on their inner peripheral side.

The connector cover 46 attached to the cable-side connector 9 is provided with two fitting portions to be fitted with the pair of cable-side connector mounting fixtures 12 and an annular vertical wall 40 to be inserted into the groove that constitutes the annular flat surface 32 of the body-side connector 8. The junction between the cable 26 and the cable-side connector 9 is sealed by the cable clamp 48 or the like.

The body-side connector 8 is secured to the motor body 2, and the cable-side connector 9 is secured to the body-side connector 8. In this way, a ground wire 36 and power supply lines 37, 38 and 39 projecting from an end of the cable 26 are electrically connected to the ground pin 7 and the power supply pins 27, 28 and 29, respectively. In FIGS. 1 and 2, the power supply lines 37 and 38 are invisible behind the ground wire 36 and the power supply line 39, respectively.

The body-interior-portion side 15 of the motor is sealed from the outside (atmosphere side 18) of the motor body 2 by the sealing portion 13 between the body-side connector 8 and the motor body 2 and the sealing portion 14 between the body-side and cable-side connectors 8 and 9. The sealing portion 13 comprises the gasket 10 and the annular groove 33 of the body-side connector 8, while the sealing portion 14 comprises the annular flat surface 32, gasket 34, and annular vertical wall 40. Thus, the waterproof performance of the body-interior-portion side 15 of the motor is improved by the sealing portions 13 and 14.

The following is a description of a method of electrical connection between the motor body 2 and the ground pin 7, which constitutes the structure of the power connector according to Embodiment 1 of the present invention.

Figure 2:
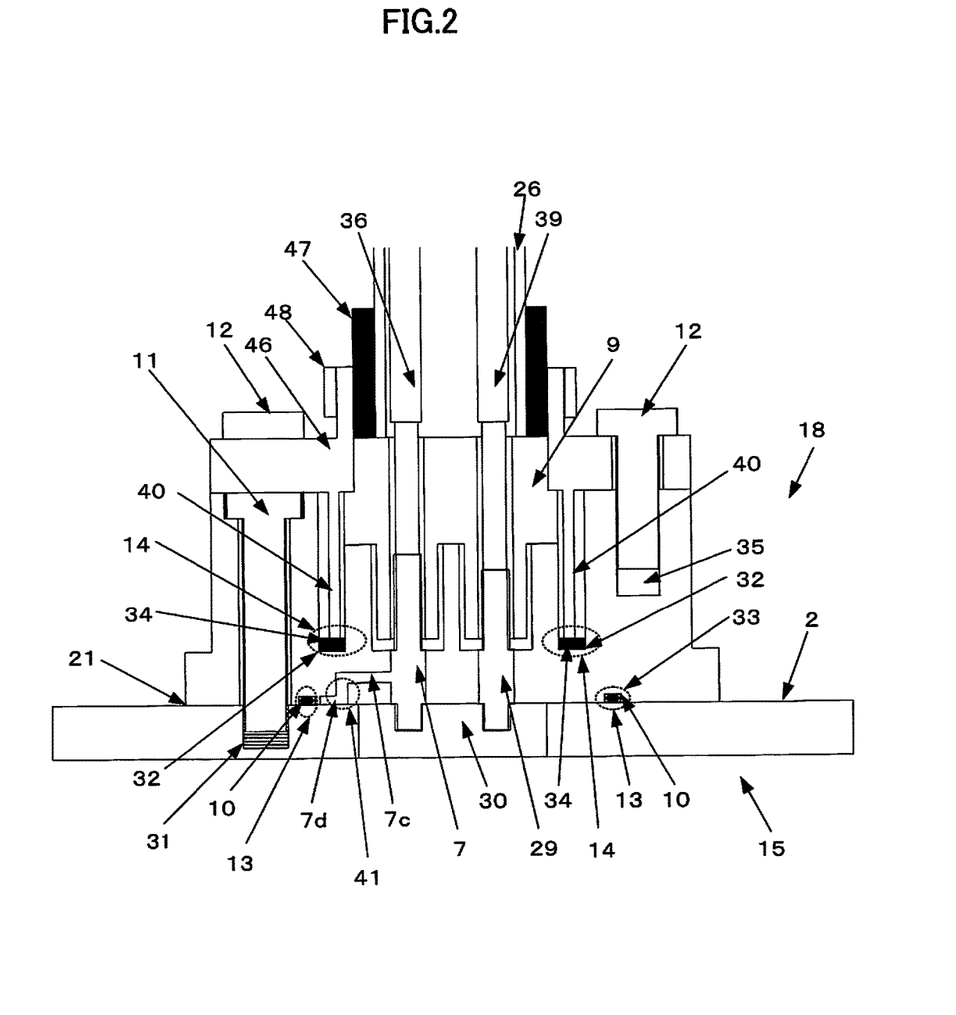
FIG. 2 is a front sectional view corresponding to FIG. 1.

As shown in FIG. 2, a side surface of an end portion of the connector mounting portion 21 of the motor body 2 on the side of the opening 30 is provided with an extending portion 7c extending laterally from the side surface. A conduction portion 7d for electrical connection with the surface of the motor body 2 is provided on an end of the extending portion 7c. The conduction portion 7d is disposed inside the annular groove 33, which constitutes the sealing portion 13 between the body-side connector 8 and the motor body 2, so as not to span the sealing portion 13 and so that it faces the connector mounting portion 21.

Figure 1:
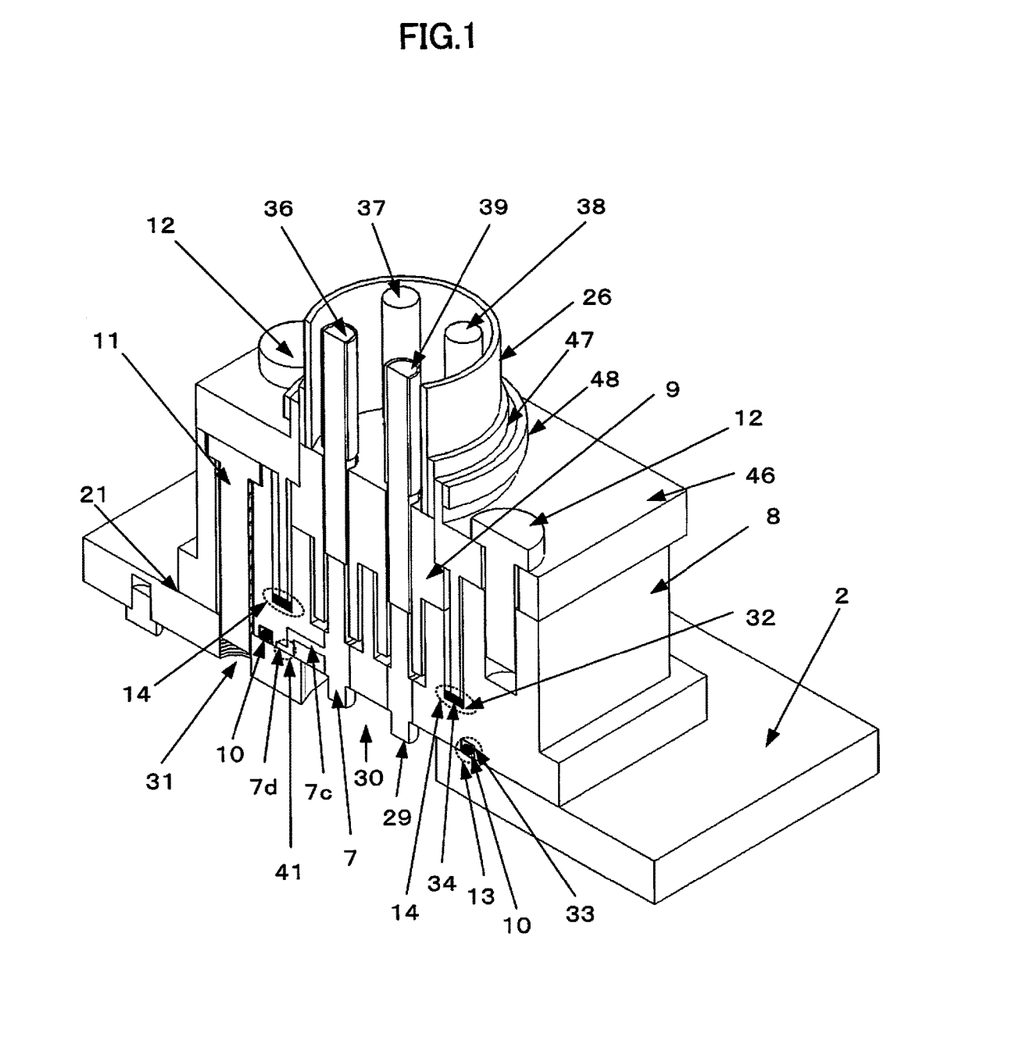
FIG. 1 is a perspective sectional view illustrating a structure of a power connector attached to an electric motor according to Embodiment 1 of the present invention.

According to the structure of the power connector of Embodiment 1 of the present invention, as shown in FIGS. 1 and 2, the ground pin 7 in the body-side connector 8 and the motor body 2 are electrically connected to each other at the connector mounting portion 21 of the motor body 2. Thus, the ground pin 7 and the motor body 2 can be electrically connected by only attaching the body-side connector 8 to the motor body 2. Further, conduction between the motor body 2 and the ground pin 7 and high waterproof performance can be achieved by electrically connecting the ground pin 7 and the motor body 2 in a predetermined position nearer to the ground pin 7 than the sealing portion 13, in attaching the body-side connector 8 to the motor body 2.

Embodiment 2

A structure of a power connector attached to an electric motor according to Embodiment 2 of the present invention will be described with reference to FIG. 3.

Figure 3:
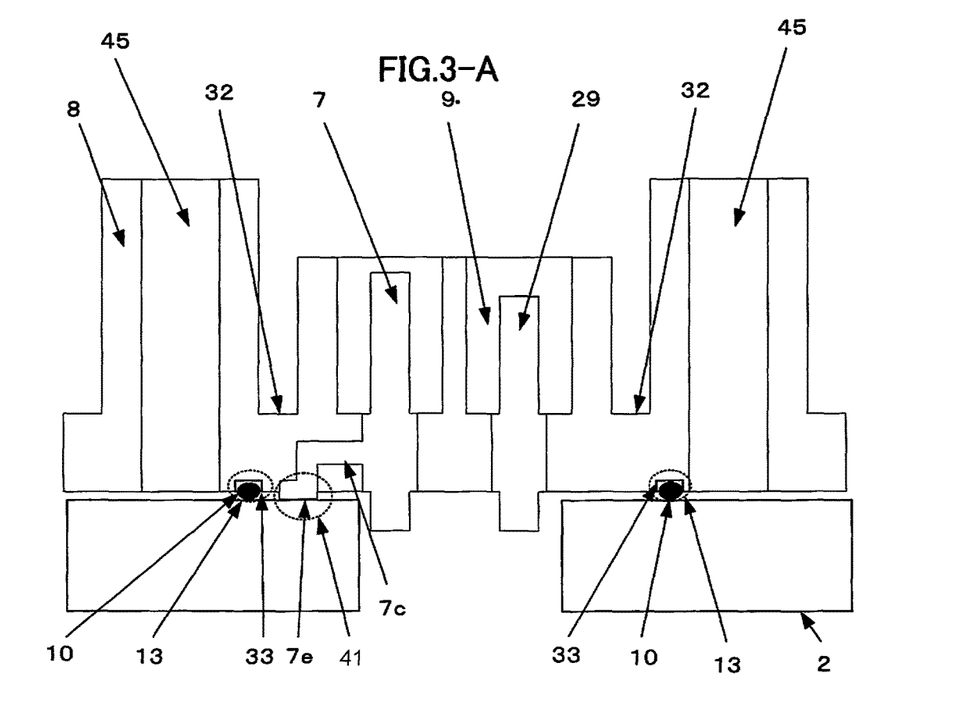

The conduction portion 7d, which is provided on the end of the extending portion 7c extending laterally from the side surface of the end portion of the ground pin 7 and serves for electrical connection with the surface of the motor body 2 (described above with reference to FIG. 2 showing the structure of the power connector of Embodiment 1), is constructed as a projecting conduction portion 7e (also referred to herein as "convex connection structure 7e") according to Embodiment 2 shown in FIG. 3. Since other configurations of the connector of this embodiment are the same as those of Embodiment 1 shown in FIG. 2, a description thereof is omitted.

Reference numeral 41 in FIG. 3 denotes a junction for conduction between a ground pin 7 and a body 2 of a motor, at which the convex connection structure 7e is located. At the junction 41, the lower end surface of the convex connection structure 7e projects from the outer peripheral surface (lower flat surface) of the resin of a body-side connector 8. Thus, when the body-side connector 8 is secured to a connector mounting portion 21 of the motor body 2, the lower end surface of the convex connection structure 7e can be positively pressed against a flat surface of the connector mounting portion 21 of the motor body 2. In this way, electrical connection between the convex connection structure 7e and the surface of the motor body 2 is ensured.

In the example shown in FIG. 3, the convex connection structure 7e (on the side of the body-side connector 8) that is electrically connected to the surface of the motor body 2 is convex. Alternatively, however, a part of the surface of the motor body 2 may be made convex.

Embodiment 3

A structure of a power connector attached to an electric motor according to Embodiment 3 of the present invention will be described with reference to FIG. 4.

Figure 4:
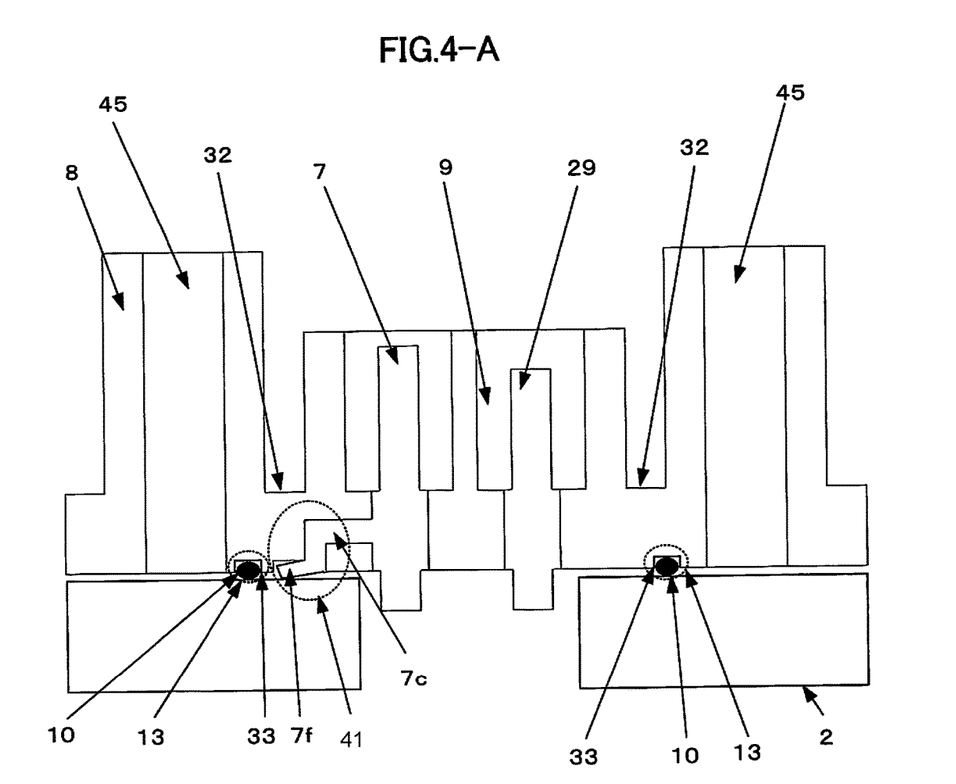

The conduction portion 7d, which is provided on the end of the extending portion 7c extending laterally from the side surface of the end portion of the ground pin 7 and serves for electrical connection with the surface of the motor body 2 (described above with reference to FIG. 2 showing the structure of the power connector of Embodiment 1), is constructed as a plate-spring conduction portion 7f according to Embodiment 3 shown in FIG. 4. Since other configurations of the connector of this embodiment are the same as those of Embodiment 1 shown in FIG. 2, a description thereof is omitted.

Reference numeral 41 in FIG. 4 denotes a junction for conduction between a ground pin 7 and a body 2 of a motor. The plate-spring conduction portion 7f, provided on the end portion of the extending portion 7c extending laterally from the side surface of the end portion of the ground pin 7, is located at the junction 41. At the junction 41, the lower end portion of the plate-spring conduction portion 7f projects from the outer peripheral surface (lower flat surface) of the resin of a body-side connector 8. Thus, when the body-side connector 8 is secured to a connector mounting portion 21 of the motor body 2, a surface of the plate-spring conduction portion 7f can be positively pressed against a surface of the connector mounting portion 21 of the motor body 2 by the spring force of the plate-spring conduction portion 7f. In this way, electrical connection between the plate-spring conduction portion 7f and the surface of the motor body 2 is ensured.

Embodiment 4

A structure of a power connector attached to an electric motor according to Embodiment 4 of the present invention will be described with reference to FIG. 5.

Figure 5:
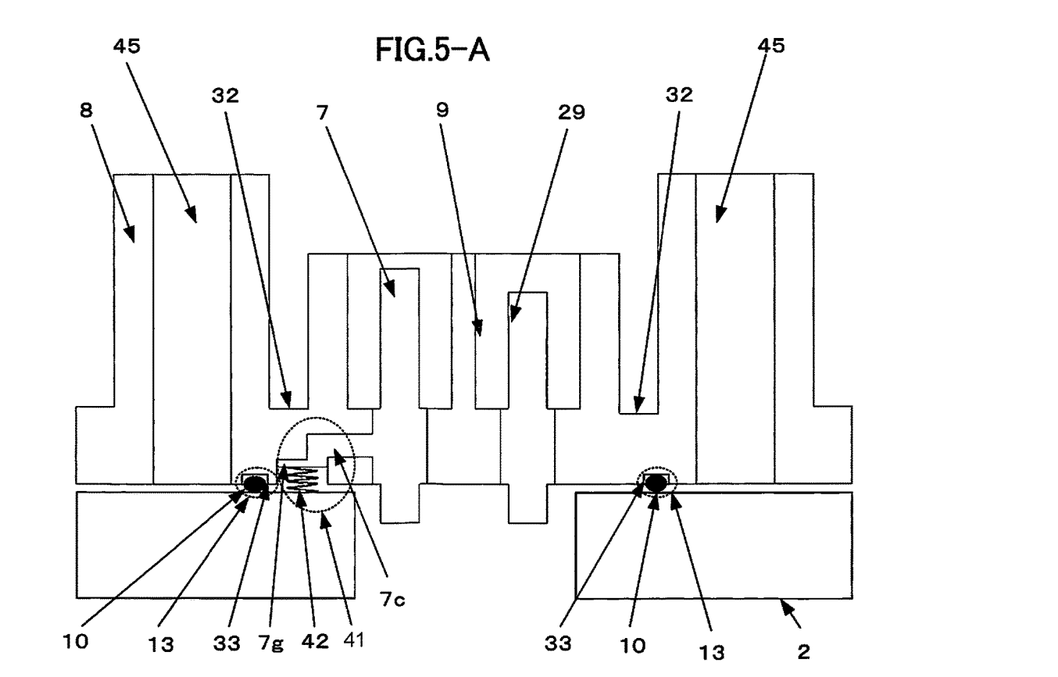

The conduction portion 7d, which serves for electrical connection with the surface of the motor body 2 (described above with reference to FIG. 2 showing the structure of the power connector of Embodiment 1), is constructed as a spring receiving portion 7g according to Embodiment 4 shown in FIG. 5. Since other configurations of the connector of this embodiment are the same as those of Embodiment 1 shown in FIG. 2, a description thereof is omitted.

Reference numeral 41 in FIG. 5 denotes a junction for conduction between a ground pin 7 and a body 2 of a motor. The spring receiving portion 7g is formed so that it is lower in level, at this junction 41, than the outer peripheral surface (lower flat surface) of the resin of a body-side connector 8, that is, it is located in a recess in the resin of the body-side connector 8. A spring 42 is accommodated in a compressed state in the spring receiving portion 7g. Thus, when the body-side connector 8 is secured to a connector mounting portion 21 of the motor body 2, the spring 42 can be positively pressed against a surface of the connector mounting portion 21 of the motor body 2. In this way, electrical connection between the spring 42 and the surface of the motor body 2 is ensured.

Embodiment 5

Figure 6:
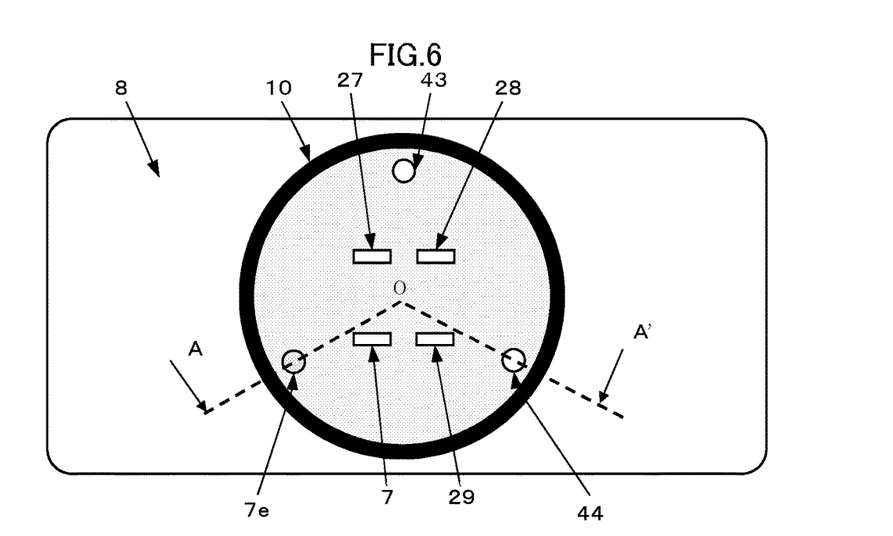
FIG. 6 is a view illustrating a structure of a power connector attached to an electric motor according to Embodiment 5 of the invention, and FIG. 6-A is a cross-section view taken along line A-A' in FIG. 6.

A structure of a power connector attached to an electric motor according to Embodiment 5 of the present invention will be described with reference to FIG. 6 and FIG. 6-A. FIG. 6-A is a cross-section view taken along line A-A' in FIG. 6. The cross-section view in FIG. 6-A is similar to FIG. 5-A, except for the portions indicated by reference numerals "7e" and "44." Other reference numerals are omitted from FIG. 6-A for simplicity.

According to Embodiment 2 shown in FIG. 3, the lower end surface of the convex connection structure 7e projects from the outer peripheral surface (lower flat surface) of the resin of a body-side connector 8. In some cases, however, the body-side connector 8 may not be stably secured to the motor body 2 if only the single convex connection structure 7e projects from the outer peripheral surface of the resin of the body-side connector 8.

According to this embodiment, as shown in FIG. 6, therefore, two protrusions 43 and 44 (also referred to herein as "convex structures 43 and 44") substantially as high as the convex connection structure 7e are disposed in addition to the convex connection structure 7e on the outer peripheral surface (lower flat surface) of the resin of the body-side connector 8. These convex structures 43 and 44 can be provided as dummies that are not grounded. Thus, the three projecting parts including the convex connection structure 7e are arranged spaced apart from one another on the outer peripheral surface of the resin of the body-side connector 8. In this way, the attitude of the body-side connector 8 relative to the motor body 2 can be stabilized when the connector 8 is secured to the connector mounting portion 21 of the motor body 2.

Also in the case of the connector structure of Embodiment 3 (FIG. 4) or Embodiment 4 (FIG. 5) described above, at least two convex structures 43 and 44 as dummies may be provided on the body-side connector 8 (or motor body 2).

The invention claimed is:

1. A structure of a connector for power or braking, the structure attached to an electric motor, the structure comprising a resin molding around at least a ground pin and a power supply pin, wherein
an electrical junction between the ground pin and a body of the electric motor or a brake is disposed in a predetermined position on an inner peripheral side of a sealing portion which seals an interior of the body of the electric motor or the brake from the air,
the electrical junction comprises a convex connection structure,
the convex connection structure is arranged on the connector and projects in an axial direction of the connector toward the body of the electric motor or the brake,
the axial direction is along a lengthwise direction of the ground pin and power supply pin,
at least two convex structures, similar to the convex connection structure and electrically connected to neither the ground pin nor the power supply pin, are further provided on the connector and project in the axial direction of the connector toward the body of the electric motor or the brake,
the connector has a lower flat surface facing a flat surface of the body of the electric motor or the brake, and
the convex connection structure and the at least two convex structures project in the axial direction beyond the lower flat surface of the connector to be pressed against the flat surface of the body of the electric motor or the brake.

* * * * *